United States Patent

[11] 3,623,700

[72] Inventor Henry W. Boteler
 East Greenwich, R.I.
[21] Appl. No. 874,231
[22] Filed Nov. 5, 1969
[45] Patented Nov. 30, 1971
[73] Assignee Grinnell Corporation
 Providence, R.I.

[54] DIAPHRAGM VALVE
 1 Claim, 3 Drawing Figs.
[52] U.S. Cl. ................................ 251/331,
 92/79
[51] Int. Cl. ................................ F16k 7/16
[50] Field of Search ........................ 251/331;
 92/79, 5, 78; 137/312

[56] References Cited
UNITED STATES PATENTS

| | | | |
|---|---|---|---|
| 1,042,745 | 10/1912 | Zahm | 137/312 |
| 3,130,954 | 4/1964 | McFarland, Jr. | 251/368 X |
| 3,131,638 | 5/1964 | Wilson et al. | 92/5 X |
| 3,361,162 | 1/1968 | Prestridge et al. | 251/368 X |

Primary Examiner—Arnold Rosenthal
Attorney—H. Edward Foerch

ABSTRACT: A diaphragm valve having gas-conducting channels which are located between the inert diaphragm and the resilient backing sheet and which extend from the interior of the valve across the clamped margins of the diaphragm and backing sheet to the edges thereof to carry to the outside of the valve any gas which may pass through the diaphragm and buildup between it and the backing sheet.

INVENTOR.
HENRY W. BOTELER

INVENTOR.
HENRY W. BOTELER

DIAPHRAGM VALVE

BACKGROUND OF THE INVENTION

1. Field of the Invention

Valves for corrosive fluids are frequently of the diaphragm type because they completely isolate the fluid from the valve actuating mechanism. Polytetrafluoroethylene (hereinafter, TFE) is a usual material for these diaphragms because of its inert properties.

Some gases can pass through a TFE diaphragm. Dry chlorine gas in an example. The rate of passage is quite low, and the TFE diaphragms are not damaged by this passage, but the resilient elastomeric backing sheets which support these diaphragms and prevent their being crushed by the metal compressor can be extensively damaged by accumulations of this gas.

2. Description of the Prior Art

Prior to this invention no special provision was made for disposal of the gas which found its way through the diaphragm to the backing sheet. There is usually a central backing sheet opening to accommodate the tube nut by which the diaphragm is connected to the compressor, and accumulating gases might find their way through this opening. But even if gas escapes through this opening, it is still trapped inside the bonnet where it can accumulate and attack the upper side of the backing sheet.

SUMMARY OF THE INVENTION

The present invention solves this problem by means of gas-conducting channels located between the diaphragm and backing sheet and extending across the clamped margins thereof to carry outside the valve any gas which has passed through the diaphragm. In a preferred form these channels are provided by a layer of porous material, such as nylon fabric, placed between the diaphragm and backing sheet. Best results are achieved when this layer is coextensive with the entire engaging surfaces of the diaphragm and backing sheet. In such form it uniformly transmits the support of the backing sheet to the diaphragm while at the same time providing maximum opportunities for the gas to "weep" to the outside of the valve through the interstices of the fabric. Because these interstices are formed by the fabric weave, they cannot be completely closed by the high clamping force on the diaphragm and backing sheet margins. Consequently, pockets of gas do not build up between the diaphragm and backing sheet.

OBJECTS

Accordingly, it is an object of the present invention to provide a diaphragm valve which has venting means between the diaphragm and the backing sheet and extending across the clamped margins thereof.

Another object is to provide a noncollapsing, gas-conducting channel located between the diaphragm and the backing sheet of a diaphragm valve through which fluid which passes through the diaphragm can escape to atmosphere.

Another object of the present invention is to improve the life of the backing sheet of a diaphragm valve.

Other objects will appear hereinafter.

The best modes in which I have contemplated applying the principles of the present invention are shown in the accompanying drawings but these are to be deemed primarily illustrative for it is intended that the claims shall cover by suitable expression in the appended claims whatever of patentable subject matter resides in the invention disclosed.

DESCRIPTION OF THE PREFERRED EMBODIMENTS

Figure 1:
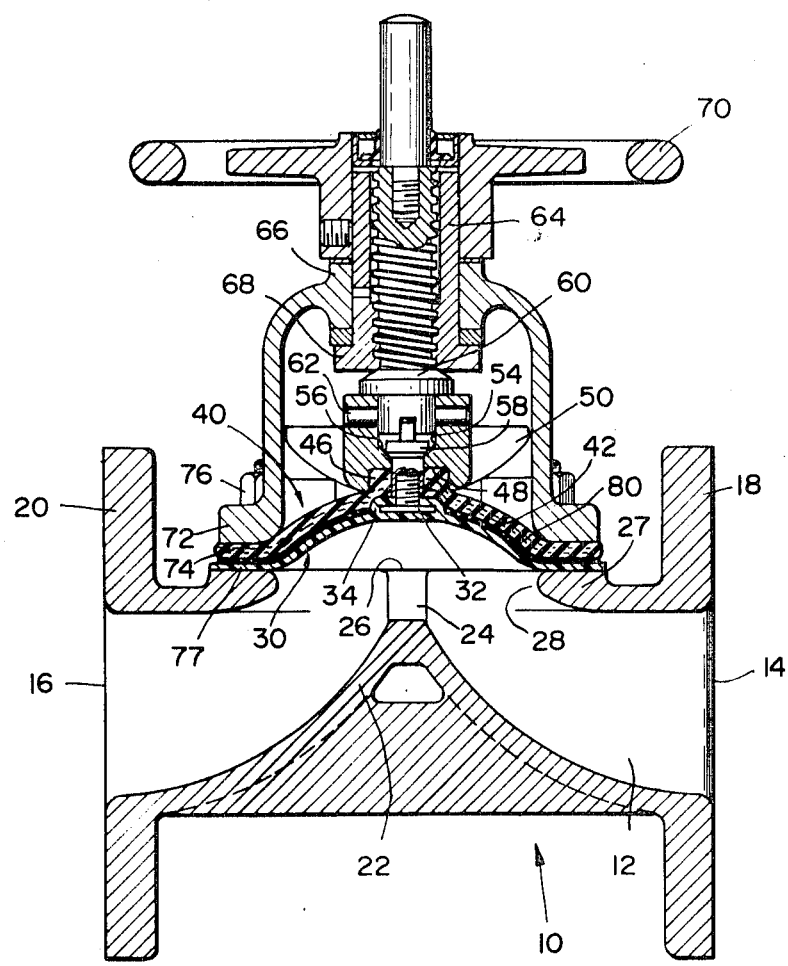
FIG. 1 is a cross-sectioned side elevation view of a diaphragm valve in accordance with a preferred form of the present invention. The valve is shown in the open position.

Referring to the drawings, FIG. 1 shows a diaphragm valve suitable for handling corrosive fluids such as dry chlorine gas. This valve has a body 10 with a passage 12 extending therethrough between ends 14 and 16. These ends have flanges on pipe, tanks, or other fluid containing devices (not shown) in the fluid-handling system.

This passage 12 is deflected at about its center by a weir 22 which extends part way into the passage from one side of the body and has a concaved surface 24 serving as a diaphragm seat. The ends of this surface blend smoothly into the flat surface 26 of a flange 27 surrounding a diaphragm opening 28 in the body on the side opposite the weir.

Figure 3:
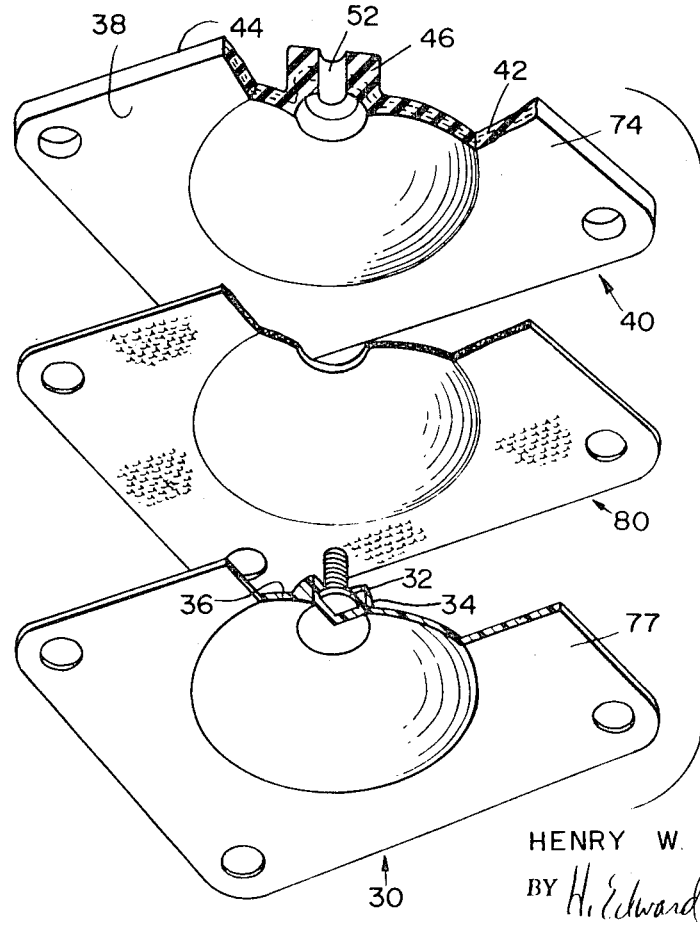
FIG. 3 is an exploded, partially sectioned, perspective view of the diaphragm, porous layer and backing sheet employed in the embodiment of FIGS. 1 and 2.

The diaphragm 30, best shown in FIG. 3, is molded TFE. The head of a metal stud 32 is embedded in a boss 34 formed on the backside 36 of the diaphragm at its domed center. This backside is shaped to fit nicely against the "face" 38 of a relatively thick elastomeric backing sheet 40. This backing sheet is also molded and has at least one layer of fabric reinforcement 42 located between its face 38 and backside 44. This reinforcement is molded in and extends throughout all part of the backing sheet. It gives the backing sheet the strength to prevent the TFE and elastomer from ballooning under the pressure of the controlled fluid. This embedded reinforcing fabric does not appear at the "face" of the backing sheet at any point.

The backing sheet also has a central boss 46 formed on its backside 44 and fitted nicely into a recess 48 in the bottom of a metal compressor 50. This boss has an aperture or passage 52 therethrough aligned with another passage 54 through the compressor. The latter passage is stepped inwardly adjacent the recess 48 to form a metal shoulder 56. A tube nut 58 lies in these passages with its head overlaying the shoulder 56 and with its shank threadedly engaging the stud 32.

The lower end of a spindle 60 is received in the upper, larger portion of the compressor passage 54 and is pivotally connected there by a crosspin 62. The upper end of the spindle is, in turn, threaded into a bushing 64 which is rotatably mounted in the bonnet 66. A flange 68 on the lower end of the bushing and a handwheel 70 secured to its upper end prevent its axial movement.

The lower edge of the bonnet 66 is flanged at 72 and engages the backing sheet margin 74. Bolts 76 secure the bonnet to the body. They clamp the backing sheet margin to the diaphragm margin 77 and the diaphragm margin to the body flange surface 26. They are tightened until a seal is achieved between this latter margin and this surface.

Figure 2:
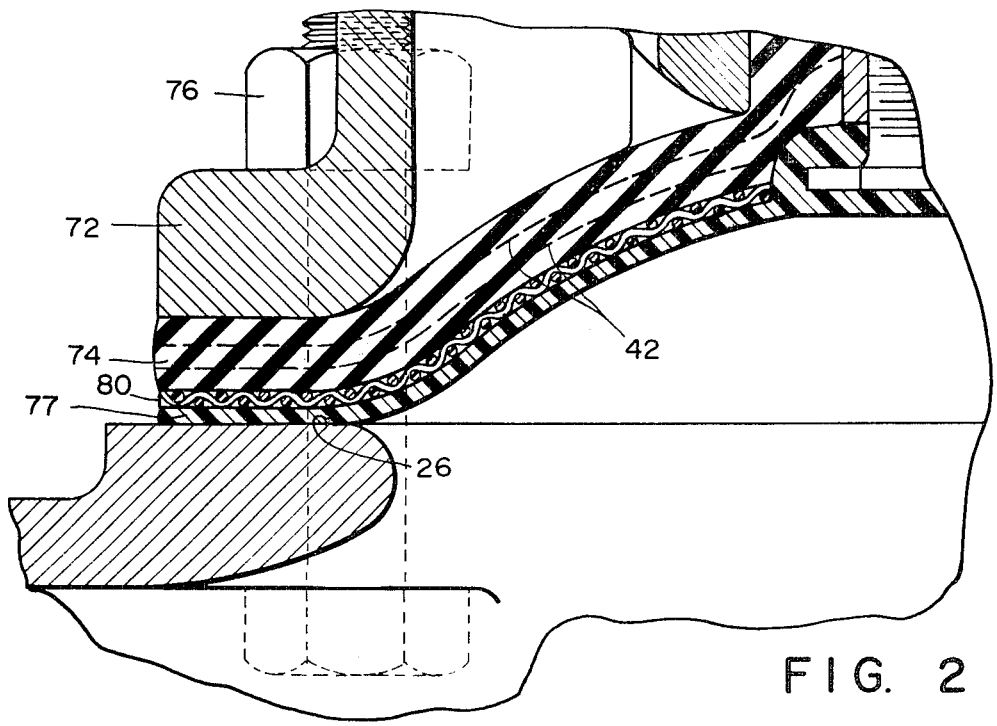
FIG. 2 is en enlarged fragmentary view of a portion of FIG. 1.

In the embodiment of FIGS. 1 to 3 the diaphragm and backing sheet are separated by a layer of fabric 80 which is sufficiently porous to permit chlorine gas, or any other fluid which is between these members, to flow along this fabric in the plane thereof and out of the valve. More particularly, the fluid moves in the spaces provided by the fabric weave radially outward between the clamped margins 77 and 74 of the diaphragm and backing sheet, respectively, even when the full clamping force is applied.

Preferably, this fabric is a nylon cloth lightly adhered to the face of the backing sheet to facilitate its installation in the valve. Two types of weave which have been found satisfactory for a 2-inch valve are furnished by West Point Pepperell Company of New York, New York and designated by it as "SN 203 (Nylon) or SN 288 (Nylon)."

The foregoing explains the usefulness of the present invention where dry chlorine gas is the fluid being controlled by the valve. Any gas which passes through the diaphragm 30 will flow outward across the flange to atmosphere rather than accumulate and attack the backing sheet. The foregoing also explains the usefulness of the invention when used to control the flow of other liquids by providing a flow path to the outside of the valve which thereby signals or indicates a possible failure of the diaphragm.

It will be apparent to those skilled in the art that modifications may be made to the flow passages disclosed herein which will produce the desired venting function within the scope of the present invention.

I claim:

1. A diaphragm valve comprising a body member having a flow passage therethrough, a diaphragm opening and a flange surrounding said diaphragm opening; a valve bonnet having valve-actuating means and a flange for clamping to said flange of said body member; a diaphragm covering said diaphragm opening, said diaphragm having pepherial edges positioned between said body and said bonnet flanges and having a stud extending toward said bonnet for attachment to said valve-actuating means; a diaphragm backing sheet overlaying said diaphragm on the side thereof closest to said bonnet, said backing sheet having pepherial edges positioned between said body and said bonnet flanges and having a central opening for receiving said stud of said diaphragm, and a layer of woven fabric between the surfaces of said diaphragm and said backing sheet and across the pepherial edges thereof for forming flow passages between said surfaces and across said flanges.

* * * * *